US008644875B2

(12) United States Patent
Kiukkonen et al.

(10) Patent No.: US 8,644,875 B2
(45) Date of Patent: Feb. 4, 2014

(54) TRANSMIT POWER CONTROL IN MULTI-RADIO APPARATUS (75) Inventors: Niko Tapani Kiukkonen, Veikkola (FI); Eng Hwee Ong, Espoo (FI); Janne Marin, Espoo (FI)

(73) Assignee: Nokia Corporation, Espoo (FI)

( * ) Notice: Subject to any disclaimer, the term of this patent is extended or adjusted under 35 U.S.C. 154(b) by 251 days.

(21) Appl. No.: 13/227,513

(22) Filed: Sep. 8, 2011

(65) Prior Publication Data

US 2013/0065525 A1   Mar. 14, 2013

(51) Int. Cl.
*H04B 7/00* (2006.01)
*H04W 52/24* (2009.01)

(52) U.S. Cl.
USPC ........... 455/522; 455/41.2; 455/515; 455/434

(58) Field of Classification Search
USPC ........ 455/41.1, 522, 69, 41.2, 41.3, 515, 434, 455/67.11; 370/318, 321
See application file for complete search history.

(56) References Cited

U.S. PATENT DOCUMENTS

2009/0311961 A1* 12/2009 Banerjea ...................... 455/41.2
2011/0105174 A1*  5/2011 Pelletier et al. ............... 455/522
2012/0252521 A1* 10/2012 Nagaraja et al. .............. 455/522

FOREIGN PATENT DOCUMENTS

WO    WO-2011/002789 A1    1/2011

OTHER PUBLICATIONS

IEEE Standard for Information Technology—Telecommunications and Information Exchange Between Systems Local and Metropolitan Area Networks—Specific Requirements; Part 11: Wireless LAN Medium Access Control (MAC) and Physical Layer (PHY) Specifications, (Jun. 12, 2007), (1232 pages).
3GPP TS 36.213 V10.1.0 (Mar. 2011) 3rd Generation Partnership Project; Technical Specification Group Radio Access Network; Evolved Universal Terrestrial Radio Access (E-UTRA); Physical layer procedures (Release 10), §5.1.1.2 Power Headroom (pp. 14 -15).

* cited by examiner

*Primary Examiner* — John J Lee
(74) *Attorney, Agent, or Firm* — Harrington & Smith (57) ABSTRACT A method, apparatus, and computer program for controlling transmission power of a radio apparatus are provided. The method includes: determining, in a radio apparatus configured to support a cellular radio access technology in communication with a cellular counterpart apparatus and a short range radio access technology in communication with a short range counterpart apparatus, a maximum total transmit power of the radio apparatus; causing the radio apparatus to use a first transmit power level in transmission to the cellular counterpart apparatus; determining a remaining transmission power margin by computing a difference between the maximum total transmit power and the first transmit power level; and causing the radio apparatus to autonomously limit a second transmit power level to fall within the remaining transmission power margin and to use the second transmit power level in transmission to the short range counterpart apparatus.

19 Claims, 3 Drawing Sheets

TRANSMIT POWER CONTROL IN MULTI-RADIO APPARATUS

FIELD

The invention relates to the field of radio communications and, particularly, to controlling transmission power of an apparatus having a plurality of radio interfaces.

BACKGROUND

Power consumption is an important factor in a battery-operated radio apparatus and, particularly, in a radio apparatus comprising a plurality of radio interfaces supporting different radio access technologies. Efficient power control mechanisms are constantly developed.

BRIEF DESCRIPTION

According to an aspect of the present invention, there is provided a method comprising: determining, in a radio apparatus configured to support a cellular radio access technology in communication with a cellular counterpart apparatus and a short range radio access technology in communication with a short range counterpart apparatus, a maximum total transmit power of the radio apparatus; causing the radio apparatus to use a first transmit power level in transmission to the cellular counterpart apparatus; determining a remaining transmission power margin by computing a difference between the maximum total transmit power and the first transmit power level; and causing the radio apparatus to autonomously limit a second transmit power level to fall within the remaining transmission power margin and to use the second transmit power level in transmission to the short range counterpart apparatus.

According to another aspect of the present invention, there is provided an apparatus comprising: at least one processor; and at least one memory including a computer program code, wherein the at least one memory and the computer program code are configured, with the at least one processor, to cause the apparatus to: determine a maximum total transmit power of a radio apparatus configured to support a cellular radio access technology in communication with a cellular counterpart apparatus and a short range radio access technology in communication with a short range counterpart apparatus; cause the radio apparatus to use a first transmit power level in transmission to the cellular counterpart apparatus; determine a remaining transmission power margin by computing a difference between the maximum total transmit power and the first transmit power level; and cause the radio apparatus to autonomously limit a second transmit power level to fall within the remaining transmission power margin and to use the second transmit power level in transmission to the short range counterpart apparatus.

According to another aspect of the present invention, there is provided an apparatus comprising means for determining, in a radio apparatus configured to support a cellular radio access technology in communication with a cellular counterpart apparatus and a short range radio access technology in communication with a short range counterpart apparatus, a maximum total transmit power of the radio apparatus; means for causing the radio apparatus to use a first transmit power level in transmission to the cellular counterpart apparatus; means for determining a remaining transmission power margin by computing a difference between the maximum total transmit power and the first transmit power level; and means for causing the radio apparatus to autonomously limit a second transmit power level to fall within the remaining transmission power margin and to use the second transmit power level in transmission to the short range counterpart apparatus.

According to yet another aspect of the present invention, there is provided a computer program product embodied on a non-transitory distribution medium readable by a computer and comprising program instructions which, when loaded into an apparatus, execute a computer process comprising: determining, in a radio apparatus configured to support a cellular radio access technology in communication with a cellular counterpart apparatus and a short range radio access technology in communication with a short range counterpart apparatus, a maximum total transmit power of the radio apparatus; causing the radio apparatus to use a first transmit power level in transmission to the cellular counterpart apparatus; determining a remaining transmission power margin by computing a difference between the maximum total transmit power and the first transmit power level; and causing the radio apparatus to autonomously limit a second transmit power level to fall within the remaining transmission power margin and to use the second transmit power level in transmission to the short range counterpart apparatus.

Embodiments of the invention are defined in the dependent claims.

LIST OF DRAWINGS

Embodiments of the present invention are described below, by way of example only, with reference to the accompanying drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
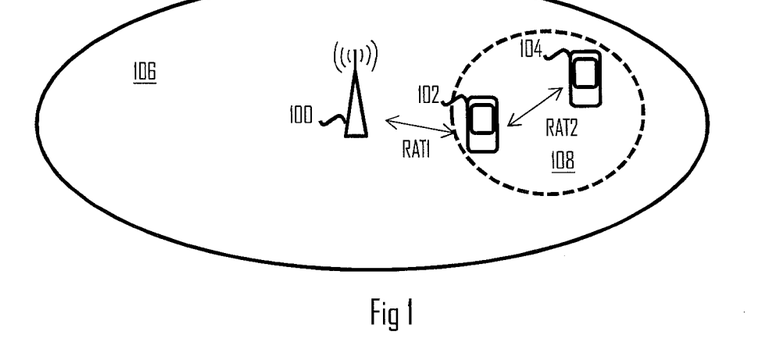
FIG. 1 illustrates a communication scenario to which embodiments of the invention may be applied.

FIG. 1 illustrates a communication scenario to which embodiments of the invention may be applied. Some embodiments of the invention are realized in a radio apparatus 102 supporting a plurality of different radio access technologies (RAT). The radio apparatus 102 may support a first RAT (RAT1 in FIG. 1) in communication with a cellular counterpart apparatus 100, e.g. a cellular base station providing cellular communication services in its control area known as a cell 106. The cellular counterpart apparatus 100 may be comprised in a network infrastructure of a cellular radio access network, and a cellular connection may be established between the radio apparatus 102 and the cellular counterpart apparatus 100. The cellular connection may be configured with parameters that comply with, for example, one of the following cellular radio access specifications: Universal Mobile Telecommunication System (UMTS) including Wideband Code Division Multiple Access (WCDMA) and/or any of its extensions comprising of High Speed Packet Access (HSPA) and HSPA evolution (HSPA+), and/or its long-term evolution versions LTE; Global System for Mobile communications (GSM) and/or any one of its extensions including General Packet Radio Service (GPRS) and Enhanced Data Rates for GSM Evolution (EDGE); International Mobile Telecommunications (IMT-2000) terrestrial radio interfaces such as Wireless Interoperability for Microwave Access (WiMAX), cdma2000, etc., and any one of its evolution versions of IMT-Advanced such as LTE-Advanced, etc.

The radio apparatus 102 may also support a second RAT (RAT2 in FIG. 1) in communication with another counterpart apparatus 104. In this case, the radio apparatus 102 may also be understood as the multi-radio apparatus. The second RAT may utilize a short range radio access scheme, wherein the short range may refer to that the communication range of RAT2 is shorter than the communication range of RAT1 in the radio apparatus 102. In other words, the radio apparatus is capable of communicating over a greater distance with RAT1 than with RAT2. The radio apparatus 102 may have a communication range of hundreds of meters and even kilometres with RAT1, while the communication range with RAT2 may be limited to dozens of meters. According to an embodiment, a maximum communication range of RAT2 may be at least decade smaller than a maximum communication range of RAT1. The counterpart apparatus 104 may be defined as a short range counterpart apparatus 104, and a radio connection between the radio apparatus 102 and the short range counterpart apparatus 104 may be configured with parameters that comply with, for example, any one of the following radio access specifications: IEEE 802.11 known as a wireless local area network (WLAN) or Wi-Fi, Bluetooth, Zigbee, Z-Wave, and Wireless Universal Serial Bus. In an embodiment utilizing the IEEE 802.11 as the second RAT, the radio apparatus 102 operates as an access point of an IEEE 802.11 basic service set (BSS). The radio apparatus 102 may be a mobile access point, for example, and it may serve as an access point for the short range counterpart apparatus 104 and, optionally, for other short range counterpart apparatuses, wherein the access point 102 and the short range counterpart apparatuses form the BSS operating on a geographical area 108 limited by the communication range of RAT2. However, it should be understood that, in other embodiments, other radio access schemes such as point-to-point schemes and/or personal area networks (PAN) may be used as RAT2.

As the radio apparatus has two radio communication roles, one as a terminal device of the cellular connection over RAT1 and another as a party of a short range communication connection over RAT2, the amount of emitted radio energy and its power consumption may be a concern in embodiments where the radio apparatus 102 has to adhere to a specific regulation and is a battery-operated device, respectively. There may be regulations that limit the emitted radio energy of the radio apparatus 102. An example of such a regulation relates to a specific absorption rate (SAR), wherein the SAR value of the radio apparatus may be limited to a determined power per kilogram value, thereby limiting the power consumption of the radio apparatus 102. Additionally, power consumption of the radio apparatus 102 has a direct impact on the operational time of the radio apparatus 102.

Figure 2:
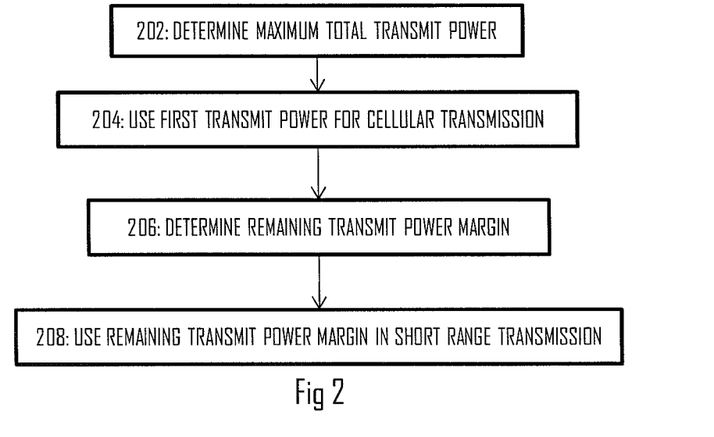
FIG. 2 illustrates an embodiment of a power control procedure.

Let us now consider an embodiment for controlling transmission power of the radio apparatus 102 with reference to a flow diagram of FIG. 2. The process of FIG. 2 may be carried out in the radio apparatus 102 as a computer process defined by at least one computer program configuring a processor to carry out the computer process. Referring to FIG. 2, in block 202 a maximum total transmit power of the radio apparatus is determined. The maximum total transmit power may be determined from the transmission power resources of the radio apparatus 102, or maximum total transmit power may be linked with the regulated SAR value and stored in the radio apparatus 102. In block 204, the radio apparatus 102 is configured to use a first transmit power level in transmission to the cellular counterpart apparatus. In an embodiment, the first transmit power level is determined on the basis of an uplink transmit power command received from the cellular counterpart apparatus 100.

In block 206, a remaining transmission power margin is determined by computing a difference between the maximum total transmit power and the first transmit power level. As a consequence, a maximum transmission power available for the short range radio connection with the short range counterpart apparatus 104 may be derived. Then, the radio apparatus 102 is configured to autonomously limit a second transmit power level to fall within the remaining transmission power margin and to use the second transmit power level in transmission to the short range counterpart apparatus 104 in block 208.

The above-mentioned procedure may be used to limit the total transmission power of the radio apparatus 102. The cellular connection RAT1 may be a primary RAT, and its transmission power may be determined freely according to the specifications of the cellular communication system. The short range connection RAT2 may be a secondary RAT, and the short range connection may be configured to utilize the remaining transmission power margin when the radio apparatus 102 transmits simultaneously over the cellular connection and the short range connection. As a consequence, the total transmission power of the radio apparatus does not exceed the maximum total transmit power even in case of transmitting through multiple RATs at a given time.

It should be understood that the number of RATs employed by the radio apparatus 102 may be higher than two. The cellular connection 102 may be the primary connection allowed to freely use any transmit power falling within the total maximum transmit power, and the remaining transmit power margin may be divided between the other RATs according to a determined power distribution algorithm, e.g. the radio apparatus may schedule transmissions of the other RATs such that no more than one RAT is allowed to transmit simultaneously with the uplink transmission over the cellular connection.

Figure 3:
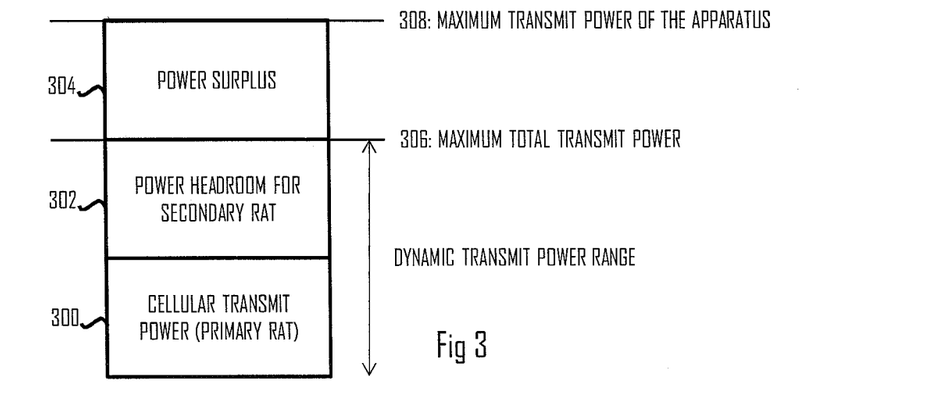
FIGS. 3 and 4 illustrate power distribution in a radio apparatus according to an embodiment of the invention.

FIG. 3 illustrates a block diagram of power allocation in the radio apparatus 102 according to an embodiment. The lowest block 300 represents a transmit power allocated to the cellular connection with the cellular counterpart apparatus 100. The portion of this block may be determined in a transmit power control procedure of the cellular communication system, wherein the transmit power control procedure may be configured to not take into account any other RAT employed in the radio apparatus 102. As a consequence, the cellular connection may be defined as the primary RAT having a priority to choose the transmit power freely. Block 300 may define the actual transmit power currently used by the radio apparatus for the primary RAT, e.g. in a transmission on a physical uplink shared channel (PUSCH) of the UMTS LTE. The transmit power headroom indicates how much additional power the terminal device has available, and it may be indicated to the cellular counterpart apparatus 100 in a power headroom report. The power headroom report may be transmitted periodically or upon a change in channel properties, for example.

Further referring to FIG. 3, a line 306 denoted by the "Maximum total transmit power" defines a maximum transmit power that the radio apparatus may use at any given time. Any possible transmit power of the radio apparatus which is over the maximum total transmit power 306 may thus be understood as power surplus 304 with respect to the maximum total transmit power 306 of the radio apparatus 102. Different radio apparatuses may have a different maximum transmit power level 308, so the level to which the maximum transmit power level 308 vary between radio apparatuses and, thus, the portion of the power surplus 304 may also be variable. The maximum total transmit power level 306 and the portion of the cellular transmit power 300 define the maximum transmit power for the short range RAT. Block 302 in FIG. 3 represents the transmission power margin available for such a secondary RAT in the radio apparatus 102 or, in other words, a power headroom for the secondary RAT. The portions of blocks 300 and 302 may vary depending on the activity of the RATs and, therefore, a momentary total transmit power of the radio apparatus defined by a sum of the transmit powers of the RATs may vary within a dynamic transmit power range between a zero transmit power level and the maximum total transmit power level 306 or even between the zero transmit power level and the maximum transmit power 308 of the radio apparatus 102. However, some embodiments aim to constraint the dynamic transmit power range to a specific maximum total transmit power 306 in order to meet regulation limits and/or improve power consumption of the radio apparatus 102.

In an embodiment, the maximum total transmit power 306 may be defined by a maximum current the radio apparatus 102 is allowed to draw from a battery when two or more radios are active. The radio apparatus 102 may be configured either to allow a power headroom for other applications, user interface, etc. or to limit the maximum current levels absorbed by the RATs. The maximum total transmit power may also depend on the remaining battery capacity. If a specific current level is exceeded, it may cause the battery voltage to drop potentially leading to a situation where the device would shut down. In addition, the extensive battery drain may cause the battery to erroneously report lower remaining capacity values than expected. Hence, this embodiment may limit the simultaneously occurring high power consumption events caused by simultaneous transmission of two or more RATs.

The distribution of the transmit power between the RATs may depend on the activity of the RATs. For example, the power headroom for the secondary RAT may depend on the activity of the primary RAT. In an embodiment, the power headroom is computed according to the following Equation (1):

$$P_{hr}^{RAT2} = zP_{hr}^{RAT1} + (1-z)P_{max}^{RAT2} \quad (1)$$

$$Z = \begin{cases} 0, & \text{primary } RAT \text{ inactive} \\ 1, & \text{primary } RAT \text{ active} \end{cases}$$

where $P_{hr}^{RAT2}$ is the power headroom 302 for the secondary RAT, $P_{max}^{RAT2}$ is the maximum transmit power of the secondary RAT, and $P_{hr}^{RAT1}$ is the power headroom of primary RAT.

z is a primary RAT transmit indicator defining whether the primary RAT is actively transmitting or silent. z may be implemented by using a unit step function U[n] such that z=0 when either the current transmit power of the primary RAT has a value of 0 watt or a value less than the lower bound of the radio apparatus's power control range, e.g. −40 dBm in the case of UMTS LTE, and z=1 otherwise. Note that the power headroom $P_{hr}^{RAT2}$ of secondary RAT defines the maximum transmit power of the secondary RAT which may be limited to the power headroom of LTE interface when it is transmitting. During occasions when the radio apparatus 102 is not transmitting over the primary RAT, the transmit power of the secondary RAT is limited by the maximum transmit power of the secondary RAT $P_{max}^{RAT2}$. Values in Equation (1) may be represented in the form of dBm (decibels with respect to one milliwatt, 1 mW). Equation (1) will ensure that the maximum total transmit power will not be exceeded even when both primary and secondary RATs are transmitting simultaneously.

Figure 4:
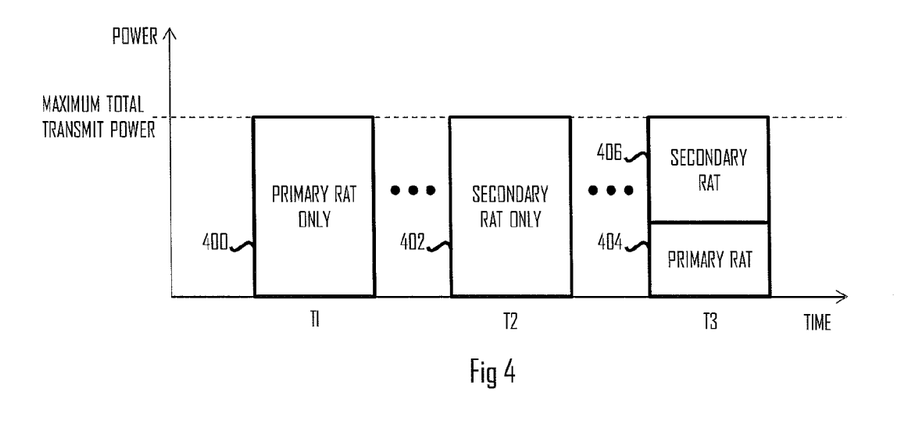

FIG. 4 illustrates three different examples related to the above-described multi-radio power control. Block 400 refers to a situation where the radio apparatus 102 uses only the primary RAT for transmission during time interval T1. Then, the primary RAT may utilize the whole transmit power capacity of the radio apparatus 102, wherein the transmit power capacity is limited by the maximum total transmit power. Block 402 refers to a situation where the radio apparatus 102 uses only the secondary RAT for transmission during time interval T2. Then, the secondary RAT may utilize the whole transmit power capacity of the radio apparatus 102, wherein the transmit power capacity is again limited by the maximum total transmit power. Blocks 404 and 406 refer to a situation where the radio apparatus 102 uses both the primary RAT and the secondary RAT for transmission during a time interval T3. Then, the primary RAT may utilize the transmit power it needs regardless of the power demand of the secondary RAT (block 404). The remaining transmit power capacity may then be used by the secondary RAT (block 406).

Figure 5:
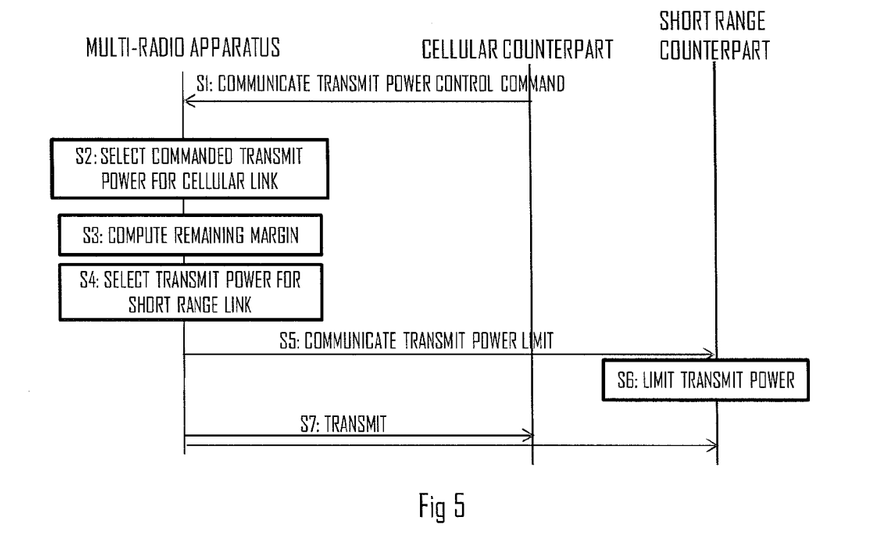
FIG. 5 illustrates a signalling diagram of balancing transmission powers according to an embodiment of the invention.

In an embodiment, the radio apparatus 102 may be configured to balance transmit powers in the short range radio system according to the transmit power available in the radio apparatus 102 for the secondary RAT. FIG. 5 illustrates a signalling diagram of such an embodiment for controlling the transmit power of the short range counterpart apparatus 104 in the radio apparatus 102 denoted by a multi-radio apparatus in FIG. 5. Referring to FIG. 5, the multi-radio apparatus determines the transmit power for an uplink transmission of the cellular connection in S2 on the basis of a transmit power control command received from the cellular counterpart apparatus in S1. In S3, the multi-radio apparatus computes the remaining transmit power margin, e.g. on the basis of Equation (1). The transmit power of the short range connection may then be determined such that it falls within the remaining transmit power margin in S4. In an embodiment, the multi-radio apparatus may use the maximum power available for the secondary RAT by default, while in other embodiments the multi-radio apparatus may select a lower transmit power according to a given criterion. For example, there may be other factors or regulations that additionally limit the transmit power of the secondary RAT.

In S5, the multi-radio apparatus transmits a control message to the short range counterpart apparatus wherein the control message comprises an information element limiting the transmit power of the short range counterpart apparatus in the current channel. The control message may be included in a beacon frame periodically transmitted by the multi-radio apparatus over the secondary RAT. The control message may be defined as a power headroom element, and Table 1 below illustrates an embodiment of a format of the control message:

TABLE 1

| Element ID | Length | Power headroom |
|---|---|---|
| 1 octet | 1 octet | 1 octet |

Element identifier (ID) field may identify the control message. The Length field may be set to one, and a Power Headroom field may define the transmit power or a maximum transmit power of the counterpart apparatus in the current channel. The value computed in Equation (1) may be applied to the Power Headroom field. The Power Headroom field may be encoded as an unsigned integer in units of dBm.

In S6, the short range counterpart apparatus limits its transmit power in response to the reception of the control message in S5. For example if the secondary RAT is the WLAN and the short range counterpart apparatus is a WLAN radio device, e.g. a terminal device (STA), the Power Headroom element may be considered as a local maximum transmit power for the channel regulatory domain known by the STA from other sources. According to the 802.11 standard, the STA shall use the minimum of local maximum transmit power received in the combination of a Country element and a Power Constraint element from the access point in its BSS and other local maximum transmit power which in this case is available in the Power Headroom element. In other words, the short range counterpart apparatus may determine the transmit power in S6 on the basis of the following Equation (2):

$$P_{max}^{local} = \min(P_{max}^{regulatory} - P_{constraint}^{local}, P_{hr}^{local}) \quad (2)$$

where $P_{max}^{local}$ is the local maximum transmit power of the short range counterpart apparatus, $P_{max}^{regulatory}$ is the regulatory maximum transmit power found in a Country element received according to IEEE 802.11 specification, $P_{constraint}^{local}$ is a local power constraint found in the Power Constraint element received according to IEEE 802.11 specification, and $P_{hr}^{local}$ is the local power headroom which may be $P_{hr}^{RAT2}$ computed in Equation (1) and received in the Power Headroom element of Table 1.

One purpose of including the Power Headroom element in the control message is to ensure that both the multi-radio apparatus and the short range counterpart apparatus maintain a balanced link in order to reduce interference and improve power consumption of the short range counterpart apparatus. In other words, the short range counterpart apparatus(es) may also reduce their transmit powers when the multi-radio apparatus has reduced its transmit power.

The multi-radio apparatus may estimate a channel quality of a radio channel between the multi-radio apparatus and the short range counterpart apparatus 104 so as to determine a modulation and coding scheme and other transmission parameters that enable efficient transmission with the transmit power selected in S4. For example, the multi-radio apparatus may send a transmit power control (TPC) request to the short range counterpart apparatus to solicit a TPC responses from the short range counterpart apparatus. This procedure may be used to determine a link margin of the short range counterpart apparatus over the secondary RAT and to ensure that a positive link margin exists. Link margin is defined as the difference between the received power and the receiver sensitivity. A positive link margin implies that the short range counterpart apparatus is able to receive the frames from the multi-radio apparatus with a sufficient power. On the other hand, an undesirable negative link margin may be avoided. In case of a negative link margin, e.g. if the link margin falls below a pre-determined threshold, the multi-radio apparatus may perform link adaptation to switch to a more robust modulation and coding scheme. In this way, the link quality of a certain required signal-to-interference-and-noise ratio (SINR) can be maintained even though the transmit power has been reduced.

In S7, the multi-radio apparatus carries out the simultaneous transmission to the cellular counterpart apparatus and the short range counterpart apparatus with the transmission power levels set in S2 and S4. The transmissions may be subsequently acknowledged by the cellular counterpart apparatus and the short range counterpart apparatus.

In an embodiment, the average transmit power of the radio apparatus 102 is reduced by reducing short range RAT transmissions when a cellular communication connection with the cellular counterpart apparatus has been established. In an embodiment, this comprises increasing a transmission periodicity of a periodically transmitted control message. For example, the period of a beacon signal transmission may be increased such that the beacon signals are transmitted less often. The length of the transmission period may be doubled, tripled, quadrupled or even increased by a decade, e.g. from 100 ms to 1 s. In another embodiment, the periodicity is basically maintained, but the radio apparatus 102 may determine to omit transmission of at least some of the control messages. The omission may be arranged not to follow any regular pattern, and the radio apparatus 102 may choose to omit transmission of a control message in an ad hoc manner. In another embodiment, the number of information elements in the control message is reduced. The radio apparatus may be configured to transmit or broadcast only key information elements such as Timestamp, Beacon Interval, Capability Information, Supported Data Rates, a physical layer (PHY) Parameter Set. In an embodiment, the key information comprises the Power Headroom of Table 1. The other information elements may be temporarily omitted as needed to reduce the average transmit power. Note that the power consumption of the radio apparatus 102 may also be reduced as a result of these embodiments.

Figure 6:
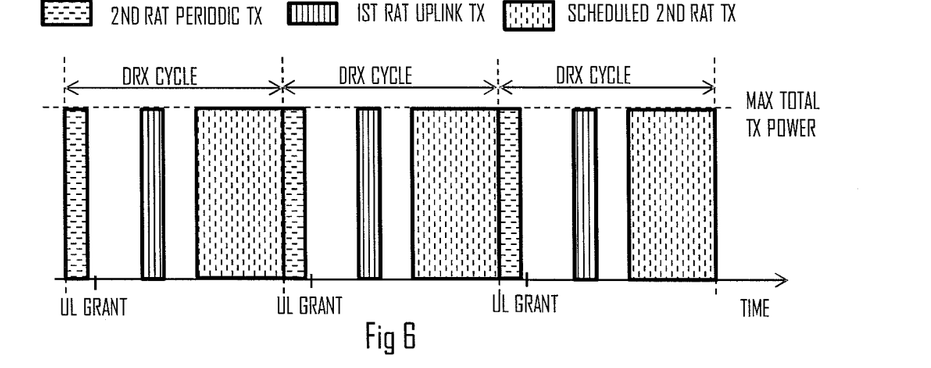
FIGS. 6 and 7 illustrate embodiments for reducing average power consumption in a radio apparatus according to some embodiments of the invention.
Figure 7:
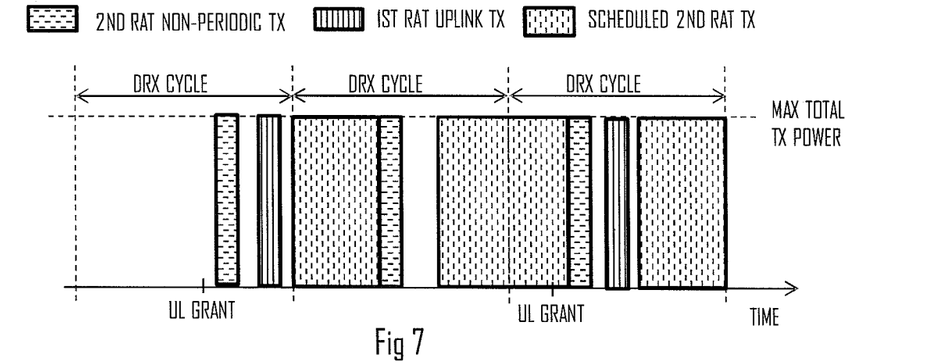

In yet another embodiment, reducing the average transmit power of the radio apparatus 102 comprises scheduling the radio apparatus 102 to transmit to the short range counterpart apparatus 104 during inactivity of the primary RAT uplink transmission. FIGS. 6 and 7 illustrate related embodiments, wherein FIG. 6 illustrates an embodiment where of the primary RAT uplink transmissions are carried out periodically, and FIG. 7 illustrates an embodiment where of the primary RAT uplink transmissions are bursty, e.g. the primary RAT uplink transmissions do not follow any regular or periodic pattern. Detection of inactivity of the primary RAT in the radio apparatus 102 may be achieved by signalling from a primary RAT interface of the radio apparatus a transmit indicator, e.g. z in Equation (1), or the inactivity pattern may be determined on the basis of prior knowledge of discontinuous transmission (DTX) and/or discontinuous reception (DRX) pattern supported by the primary RAT. The DRX operation is based on a DRX cycle which consists of an ON duration during which the radio apparatus monitors and decodes a physical downlink control channel (PDCCH) of the primary RAT, and an OFF duration (DRX opportunity) during which the primary RAT interface of the radio apparatus may enter micro sleep. If the primary RAT interface detects on the PDCCH no scheduled activity for the radio apparatus 102, the primary RAT interface may enter a sleep mode until the beginning of the next DRX cycle. On the other hand, if the PDCCH carries a downlink assignment, the primary RAT interface of the radio apparatus will start reception from the current transmission time interval (TTI). If there is an uplink grant, the primary RAT interface of the radio apparatus 102 will start transmitting after a delay of 4 ms or 4 consecutive TTIs. Such a scheme is utilized in the UMTS LTE, for example. In an embodiment, the radio apparatus 102 is configured to carry out a secondary RAT transmission during the interval after the uplink transmission of primary RAT and before the PDCCH reception in the next DRX cycle. The secondary RAT transmission may be scheduled to occur after the primary RAT transmission upon acquiring an uplink grant indication from the primary RAT interface of the radio apparatus 102 during PDCCH monitoring and decoding. In another embodiment, the radio apparatus 102 is configured to carry out a secondary RAT transmission during the activity of a reception in the primary RAT interface of the radio apparatus 102. The radio apparatus may apply a condition that the secondary RAT transmission should not occupy a reception frequency of the primary RAT interface so as to prevent interference. Such a condition may also be satisfied if the primary and secondary RATs are located in non-interfering frequency bands.

Let us first consider the embodiment where the primary RAT uplink transmissions have a periodic pattern. An example of such a scenario is when the primary RAT transfers Voice over Internet Protocol (VoIP) data. FIG. 6 illustrates three consecutive DRX cycles of the primary RAT. From the start of each DRX cycle, the reception of the primary RAT interface of the radio apparatus is ON so as to monitor and decode the PDCCH. The radio apparatus 102 utilizes this periodic ON duration in the primary RAT uplink transmission and transmits a periodic control message of the secondary RAT at the beginning of each DRX cycle of the primary RAT, as shown in FIG. 6 by boxes with horizontal dashed lining. The periodic control message may comprise a beacon signal of the WLAN or a periodic Bluetooth Inquiry transmission, for example. Further referring to FIG. 6 of the periodic primary RAT uplink, the PDCCH carries an uplink (UL) grant on the PDCCH in every DRX cycle which means that the radio apparatus carries out the primary RAT uplink transmission periodically, as shown in FIG. 6 by boxes with vertical solid lining. The radio apparatus 102 may be configured to suspend the secondary RAT transmission during these ON durations of the primary RAT uplink. The radio apparatus 102 may have pre-knowledge such as from the fixed packetization interval of a specific voice codec or it may determine from the periodic behaviour of the primary RAT uplink that the primary RAT is inactive for remaining duration from the end of the primary RAT uplink transmission to the end of the DRX cycle. Accordingly, the radio apparatus 102 may be configured to schedule a secondary RAT transmission to this OFF duration of the primary RAT, as shown by boxes with vertical dashed lining in FIG. 6. in the above-described embodiments, the radio apparatus synchronizes the secondary RAT transmissions to the inactive periods of the primary RAT uplink. As a consequence, the radio apparatus 102 transmits with only one RAT at a time by adjusting transmissions in the secondary RAT according to the uplink transmissions in the primary RAT. The radio apparatus may, however, carry out secondary RAT transmissions during the activity or inactivity time of the primary RAT reception in the radio apparatus 102, particularly if the secondary RAT operates on a frequency band not overlapping with the primary RAT downlink band.

In an embodiment where the radio apparatus 102 is an access point or another controlling element of the secondary RAT network, e.g. a BSS of the WLAN, it is able to schedule periodic quiet intervals during which the other members of the secondary RAT network cease from transmitting. This enables the radio apparatus 102 itself to transmit during these quiet intervals. The radio apparatus may specify the quiet interval by using a periodic quiet duration, periodicity of the quiet interval, and a quiet offset value which determines the start of the quiet interval. The quiet offset may use the start of each beacon transmission as a reference time instant. The periodicity may be determined by the quiet period which refers to the number of beacon intervals between the start of each periodically scheduled quiet intervals. Notice that FIG. 6 illustrates a quiet period of one, wherein one quiet interval is scheduled in every beacon interval. The quiet interval may be scheduled in a beacon message. The quiet interval may be set in the beacon message to the current beacon interval by setting a quiet count to zero in the beacon message, or it may be set to a future beacon interval by setting the quiet count to a value higher than zero.

Let us now consider the case of bursty primary RAT uplink traffic. By default, the bursty traffic is less predictable than the periodic traffic following a determined transmission pattern. In an embodiment, the radio apparatus 102 is configured to offset the periodicity of the periodic control message from a default time instant, during the DRX cycle, by an amount that equals to the ON duration of the DRX cycle of the primary RAT. For example, if the DRX cycle contains an uplink grant, the periodic control message may be offset to be transmitted periodically at a given time instant during the inactivity period of the primary RAT interface. In case of bursty traffic, a PDCCH message uplink grant may be received in a variable location after the ON duration within the DRX cycle. In order to enable the cellular (primary RAT) interface of the radio apparatus 102 to receive such "delayed" uplink grants, the cellular system may employ a DRX inactivity timer known from the UMTS LTE system, for example. The DRX inactivity timer is a mechanism employed to keep the primary RAT interface of the radio apparatus "alive" after the expiry of its ON duration during the DRX cycle, wherein the primary RAT interface of the radio apparatus continues to monitor and decode the PDCCH for the duration of the DRX inactivity timer after the ON duration. In such a case, the radio apparatus may be configured to dynamically offset the transmission timing of the periodic control message, e.g. the beacon signal, thus making the periodic control message in practice non-periodic. The offset may be determined on the basis of the uplink transmission inactivity of the primary RAT interface. Moreover, a periodicity parameter of the quiet interval may be set to zero to indicate non-periodic quiet intervals. For example, the transmission of the periodic control message may be postponed to occur when the DRX inactivity timer has lapsed or between the uplink grant and the uplink transmission over the primary RAT, as described above. With reference to FIG. 7, the transmission of the periodic control message may be postponed in the first DRX cycle and the third DRX cycle because of the uplink grants are received in variable instants during the DRX cycles. With respect to the second DRX cycle, the transmission of the periodic control message may be configured to occur in the default instant of the control message when there is no activity, i.e. UL grant detected by the primary RAT interface of the radio apparatus, or it may also be delayed to occur when the DRX inactivity timer has elapsed.

The radio apparatus 102 may delay scheduled transmissions over the secondary RAT upon detecting that the DRX inactivity timer of the primary RAT interface has been activated. For example, the radio apparatus may schedule the quiet period to occur during OFF durations of the primary RAT interface, e.g. to time intervals after the expiry of the ON duration when no uplink grant has been detected. Referring to FIG. 7, when the PDCCH of the second DRX cycle has been detected to contain no uplink grant, the radio apparatus 102 may be configured to utilize the remaining duration of the DRX cycle to schedule the quiet interval in the secondary RAT network so as to carry out the transmission over the secondary RAT. This is shown as the secondary RAT transmission, indicated by boxes with vertical dashed lining, towards the end of the second DRX cycle in FIG. 7. As in connection with FIG. 6, the radio apparatus 102 may schedule a quiet interval to the remaining duration of the DRX cycle after the primary RAT uplink transmission. This is shown in FIG. 7 by the scheduled quiet interval at the end of the third DRX cycle. In yet another embodiment, the radio apparatus may utilize the time intervals in the beginning of the DRX cycles when the primary RAT interface is monitoring and decoding the PDCCH, e.g. during the ON duration of the DRX cycle. The radio apparatus 102 may also schedule a quiet interval at the beginning of the DRX cycle and to carry out transmission over the secondary RAT until the detection of the uplink grant and, in some embodiments, between the detection of the uplink grant and the start of the primary RAT uplink transmission. For example, the quiet interval at the end of the second DRX cycle is scheduled to extend beyond the beginning of the third DRX cycle. In other embodiments, the quiet interval scheduled to the ON duration of the DRX cycle may be allocated to a different frequency band than the frequency band of the primary RAT interface so as to prevent interference.

By using the quiet intervals, the radio apparatus 102 may silence all of its short range counterpart apparatus(es) 104 during the quite interval so it may to carry out its own secondary RAT transmissions. In this way, the primary RAT and secondary RAT interfaces may be configured to transmit in different time intervals which significantly reduces the average transmit power. The radio apparatus 102 may schedule itself to transmit over the secondary RAT such that it avoids times when the primary RAT interface will or may transmit. It is worth to mention that such scheduling of primary RAT and secondary RAT transmissions offers more flexibility over simultaneous transmissions from both primary RAT and secondary RAT such that the transmit power of the secondary RAT is not constrained by the available power headroom, and hence has a wider dynamic range of up to the maximum total transmit power.

In an embodiment, upon determining that the cellular radio access communication currently utilizes the non-periodic uplink transmission scheme and upon determining that the inactivity timer is not activated, The radio apparatus 102 may decide to maintain default periodicity of a periodic short range control message. The radio apparatus 102 may further arrange a variable offset between the two consecutive periodic short range control messages. The offset may relate to a quiet interval for the short range radio access technology transmissions, for example.

Any of the embodiments described above in connection with FIGS. 6 and 7 may naturally be combined with other embodiments. In general, the radio apparatus 102 may, upon determining that the primary RAT currently utilizes the periodic uplink transmission scheme, maintain periodicity of said periodically transmitted control message and arranging an offset between a periodic cellular uplink transmission and a periodic short range control message transmission. On the other hand, upon determining that the primary RAT currently utilizes the non-periodic uplink transmission scheme, dynamically offsetting a transmission timing of the short range control message transmission so as to prevent overlapping with a non-periodic cellular uplink transmission. In another embodiment, the radio apparatus may allocate secondary RAT transmissions to those time intervals where the primary RAT is known to be inactive.

FIGS. 6 and 7 also illustrate the maximum total transmit power by the horizontal dash line, and the actual transmission powers denoted by the vertical dimension of the blocks may be determined to fall within the maximum total transmit power, as described above.

The embodiments described above in connection with FIGS. 6 and 7 are directed to avoiding simultaneous transmissions by the radio apparatus 102 over both the primary RAT and the secondary RAT. However, these embodiments may also be configured to allow the simultaneous transmission and to carry out the transmission power control described above in connection with FIGS. 2 to 5.

Figure 8:
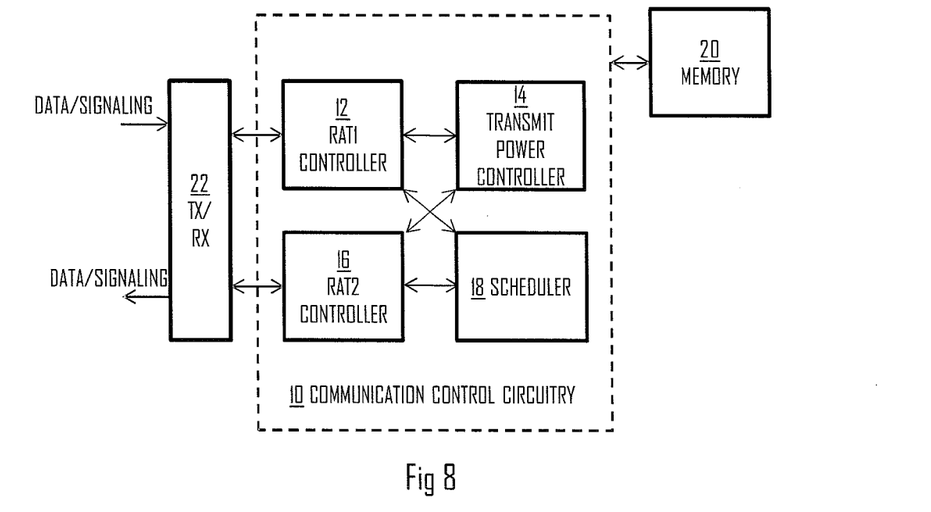
FIG. 8 illustrates a block diagram of an apparatus according to an embodiment of the invention.

FIG. 8 illustrates an embodiment of an apparatus comprising means for carrying out the above-mentioned functionalities of the radio apparatus 102. The radio apparatus 102 may be a communication apparatus a cellular communication scheme and a short range radio communication scheme, as described above. The apparatus may also be a cognitive radio apparatus capable of adapting its operation to a changing radio environment, e.g. to change the operational parameters of the secondary RAT according to the parameters of the primary RAT. The apparatus may be a computer (PC), a laptop, a tabloid computer, a cellular phone, a palm computer, a fixed or mobile base station operating as the access point for the secondary RAT network, or any other apparatus provided with radio communication capability. Another embodiment represents an apparatus comprised in such a communication apparatus, e.g. the apparatus may comprise a circuitry, e.g. a chip, a processor, a micro controller, or a combination of such circuitries in the communication apparatus.

The apparatus may comprise a communication controller circuitry 10 configured to control the communications in the communication apparatus. The communication controller circuitry 10 may comprise a primary RAT controller circuitry 12 handling signalling and data transfer over the primary RAT. The primary RAT controller circuitry 12 may comprise at least some components of the above-described primary RAT interface. The primary RAT controller circuitry 12 may be configured to operate as a terminal device of a cellular communication system. The communication controller circuitry 10 may further comprise a secondary RAT controller circuitry 16 handling signalling and data transfer over the secondary RAT. The secondary RAT may realize the functionalities of an apparatus of the secondary RAT network, e.g. the mobile access point of the WLAN network.

The communication controller circuitry 10 may further comprise a transmit power controller circuitry 14 configured to control the transmit power of the primary RAT interface according to a power control scheme utilized in the cellular communication system. For example, the transmit power controller circuitry 14 may receive uplink transmit power control commands from the cellular counterpart apparatus through the primary RAT controller circuitry 12 and to cause the primary RAT controller circuitry 12 to carry out the uplink transmission with the commanded transmit power level. With respect to the secondary RAT, the transmit power controller circuitry 14 may be configured to determine whether or not the primary and secondary RAT are transmitting simultaneously and, upon detecting the simultaneous transmission, it may cause the secondary RAT controller circuitry 16 to use a transmit power level that results in total transmission power that stays within the maximum total transmit power. Thus, the transmit power controller circuitry 14 may be configured to carry out the transmit power control, as described above in connection with FIGS. 2 to 5.

The communication controller circuitry 10 may further comprise a scheduler circuitry 18 configured to schedule the secondary RAT control message transmissions and subsequently quiet intervals for its own secondary RAT transmissions, as described above in connection with FIGS. 6 and 7. The primary RAT controller circuitry 12 may convey information on the activity of the primary RAT to the scheduler circuitry 18, and the scheduler circuitry 18 may then schedule the transmissions over the secondary RAT, as described above.

The circuitries 12 to 18 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 12 to 18 or all of them.

The apparatus may further comprise the memory 20 that stores computer programs (software) configuring the apparatus to perform the above-described functionalities of the radio apparatus 102. The memory 20 may also store communication parameters and other information needed for the wireless communications, e.g. the maximum total transmit power and/ or the rules for scheduling the secondary RAT transmissions. The apparatus may further comprise radio interface components 22 providing the apparatus with radio communication capabilities over the primary and at least one secondary RAT. The radio interface components 22 may comprise different components for the primary RAT and the secondary RAT, or it may utilize at least partly the same components for both the primary RAT and the secondary RAT. The radio interface components 22 may comprise standard well-known components such as amplifier, filter, frequency-converter, (de) modulator, and encoder/decoder circuitries and one or more antennas. The apparatus may further comprise a user interface enabling interaction with the user of the communication device. The user interface may comprise a display, a keypad or a keyboard, a loudspeaker, etc.

In an embodiment, the apparatus carrying out the embodiments of the invention in the communication apparatus comprises at least one processor and at least one memory including a computer program code, wherein the at least one memory and the computer program code are configured, with the at least one processor, to cause the apparatus to carry out the steps of the process of FIG. 2. In further embodiments, the at least one memory and the computer program code are configured, with the at least one processor, to cause the apparatus to carry out any one of the embodiments related to processing channel reservations, as described above in connection with FIGS. 2 to 7. Accordingly, the at least one processor, the memory, and the computer program code form processing means for carrying out embodiments of the present invention in the wireless communication apparatus.

As used in this application, the term 'circuitry' refers to all of the following: (a) hardware-only circuit implementations, such as implementations in only analogue and/or digital circuitry, and (b) to combinations of circuits and software (and/ or firmware), such as (as applicable): (i) a combination of processor(s) or (ii) portions of processor(s)/software including digital signal processor(s), software, and memory(ies) that work together to cause an apparatus to perform various functions, and (c) to circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a mobile phone or a similar integrated circuit in server, a cellular network device, or other network device.

The processes or methods described in FIGS. 2 to 7 may also be carried out in the form of a computer process defined by a computer program. The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to communication systems defined above but also to other suitable communication systems. The protocols used, the specifications of communication systems, their network elements and subscriber terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
   determining, in a radio apparatus configured to support a cellular radio access technology in communication with a cellular counterpart apparatus and a short range radio access technology in communication with a short range counterpart apparatus, a maximum total transmit power of the radio apparatus;
   causing the radio apparatus to use a first transmit power level in transmission to the cellular counterpart apparatus;
   determining a remaining transmission power margin by computing a difference between the maximum total transmit power and the first transmit power level; and
   causing the radio apparatus to autonomously limit a second transmit power level to fall within the remaining transmission power margin and to use the second transmit power level in transmission to the short range counterpart apparatus.

2. The method of claim further comprising causing the radio apparatus to transmit a control message to the short range counterpart apparatus, the control message comprising an information element defining the remaining transmission power margin, thereby setting a maximum transmit power of the short range counterpart apparatus.

3. The method claim 1, further comprising configuring the radio apparatus to control an average transmit power by reducing short range radio access technology transmissions when a cellular communication connection with the cellular counterpart apparatus has been established.

4. The method of claim 3, wherein reducing the short range radio access technology transmissions comprises increasing a transmission periodicity of a periodically transmitted control message.

5. The method of claim 3, wherein reducing the short range radio access technology transmissions comprises reducing information elements included in a transmitted control message.

6. The method of claim 3, wherein reducing the short range radio access technology transmissions comprises scheduling transmission interval to the radio apparatus so as to transmit to the short range counterpart apparatus during inactivity of the cellular communication, wherein the scheduling prevents the short range counterpart apparatus from carrying the transmission during the scheduled transmission interval.

7. The method of claim 1, further comprising:
determining whether the cellular radio access communication currently utilizes a periodic uplink transmission scheme or a non-periodic uplink transmission scheme;
upon determining that the cellular radio access communication currently utilizes the periodic uplink transmission scheme, maintaining periodicity of said periodically transmitted control message and arranging an offset between a periodic cellular uplink transmission and a periodic short range control message transmission;
upon determining that the cellular radio access communication currently utilizes the non-periodic uplink transmission scheme, dynamically offsetting a transmission timing of the short range control message transmission so as to prevent overlapping with a non-periodic cellular uplink transmission.

8. The method of claim 1, further comprising:
upon de e mining that the cellular radio access communication currently utilizes the non-periodic uplink transmission scheme, monitoring for an activation of an inactivity timer in the cellular radio access communication;
upon determining that the inactivity timer is not activated, maintaining default periodicity of a periodic short range control message;
upon determining that the inactivity timer is activated, dynamically offsetting the transmission timing of the short range control message transmission and arranging a variable offset between a non-periodic cellular uplink transmission and the short range control message.

9. The method of claim 1, further comprising:
causing radio apparatus to apply the second transmit power level when transmitting simultaneously to the cellular counterpart apparatus and the short range counterpart apparatus; and
causing the radio apparatus to apply a third transmit power level in transmission to the short range counterpart apparatus when there is no transmission to the cellular counterpart apparatus, wherein the third transmit power level is higher than the remaining transmission power margin and lower than the maximum total transmit power.

10. An apparatus comprising:
at least one processor; and
at least one memory including a computer pr code, wherein the at least one memory and the computer program ode are configured, with the at least one processor, to cause the apparatus to:
determine a maximum total transmit power of a radio apparatus configured to support a cellular radio access technology in communication with a cellular counterpart apparatus and a short range radio access technology in communication with a short range counterpart apparatus;
cause the radio apparatus to use a first transmit power level in transmission to the cellular counterpart apparatus;
determine a remaining transmission power margin by computing a difference between the maximum total transmit power and the first transmit power level; and
cause the radio apparatus to autonomously limit a second transmit power level to fell within the remaining transmission power margin and to use the second transmit power level in transmission to the short range counterpart apparatus.

11. The apparatus of claim 10, wherein the at least one memory and the computer program code are configured, with the at least one processor, to cause the apparatus to cause the radio apparatus to transmit a control message to the short range counterpart apparatus, the control message comprising an information element defining the remaining transmission power margin, thereby setting a maximum transmit power of the short range counterpart apparatus.

12. The apparatus of claim 10, wherein the at least one memory and the computer program code are configured, with the at least one processor, to cause the apparatus to configure the radio apparatus to control an average transmit power by reducing short range radio access technology transmissions when cellular communication connection with the cellular counterpart apparatus has been established.

13. The apparatus of claim 12, wherein the at least one memory and the computer program code are configured, with the at least one processor, to cause the apparatus to reduce the short range radio access technology transmissions comprises increasing a transmission periodicity of a periodically transmitted control message.

14. The apparatus of claim 12, wherein the at least one memory and the computer program code are configured, with the at least one processor, to cause the apparatus to reduce the short range radio access technology transmissions comprises reducing information elements included in a transmitted control message.

15. The apparatus of claim 12, wherein the at least one memory and the computer program code are configured, with the at least one processor, to cause the apparatus to reduce the short range radio access technology transmissions comprises scheduling a transmission interval to the radio app a us so as to transmit to the short range counterpart apparatus during inactivity f the cellular communication, wherein the scheduling prevents the short range counterpart apparatus from carrying out the transmission during the scheduled transmission interval.

16. The apparatus of claim 10, wherein the one memory and the computer program configured, with the at least one processor, to cause the apparatus to:
determine whether the cellular radio access communication currently utilizes a periodic uplink transmission scheme or a non-periodic uplink transmission scheme;
upon determining that the cellular radio access communication currently utilizes the periodic uplink transmission scheme, maintain periodicity of said periodically transmitted control message and arranging an offset between a periodic cellular uplink transmission and a periodic short range control message transmission;
upon determining that the cellular radio access communication currently utilizes the non-periodic uplink transmission scheme, dynamically offset a transmission timing of the short range control message transmission so as to prevent overlapping with a non-periodic cellular uplink transmission.

17. The apparatus of claim 10, further comprising:
upon determining that the cellular radio access communication currently utilizes the non-periodic uplink transmission scheme, monitor for an activation of an inactivity timer in the cellular radio access communication;
upon determining that the inactivity timer is not activated, maintain default periodicity of a periodic short range control message;
upon determining that the inactivity timer is activated, dynamically offset the transmission timing of the short range control message transmission and arrange a variable offset between a non-periodic cellular uplink transmission and the short range control message.

18. The apparatus of claim 10, further comprising interface components providing the apparatus with radio communication capability with the cellular counterpart apparatus and the short counterpart apparatus.

19. A non-transitory computer program product embodied on a distribution medium readable by a computer and comprising program instructions which, when loaded into an apparatus, execute a computer process comprising:
determining, in a radio apparatus configured to support a cellular radio access technology in communication with a cellular counterpart apparatus and a short range radio access technology in communication with a short range counterpart apparatus, a maximum total transmit power of the radio apparatus;
causing the radio apparatus to use a first transmit power level in transmission to the cellular counterpart apparatus;
determining a remaining transmission power margin by computing a difference between the maximum total transmit power and the first transmit power level; and
causing the radio apparatus to autonomously limit a second transmit power level to fall within remaining transmission power margin and to use the second transmit power level in transmission to the short range counterpart apparatus.

* * * * *

UNITED STATES PATENT AND TRADEMARK OFFICE
CERTIFICATE OF CORRECTION

PATENT NO. : 8,644,875 B2
APPLICATION NO. : 13/227513
DATED : February 4, 2014
INVENTOR(S) : Niko Tapani Kiukkonen et al.

It is certified that error appears in the above-identified patent and that said Letters Patent is hereby corrected as shown below:

In the Claims

Column 14, line 59, "claim" should be deleted and --claim 1,-- should be inserted.

Column 15, line 12, "scheduling" should be deleted and --scheduling a-- should be inserted.
Column 15, line 16, "carrying the" should be deleted and --carrying out the-- should be inserted.
Column 15, line 36, "de e mining" should be deleted and --determining-- should be inserted.
Column 15, line 49, "causing radio" should be deleted and --causing the radio-- should be inserted.
Column 15, line 61, "pr" should be deleted and --program-- should be inserted.
Column 15, line 62, "ode" should be deleted and --code-- should be inserted.

Column 16, line 10, "fell" should be deleted and --fall-- should be inserted.
Column 16, line 28, "when cellular" should be deleted and --when a cellular-- should be inserted.
Column 16, line 47, "app a us" should be deleted and --apparatus-- should be inserted.
Column 16, line 49, "f the" should be deleted and --of the-- should be inserted.
Column 16, line 53, "the one" should be deleted and --the at least one-- should be inserted.
Column 16, line 54, "program configured" should be deleted and --program code are configured-- should be inserted.

Column 17, line 16, "comprising interface" should be deleted and --comprising radio interface-- should be inserted.
Column 17, line 19, "short counterpart" should be deleted and --short range counterpart-- should be inserted.

Column 18, line 16, "within remaining" should be deleted and --within the remaining-- should be inserted.

Signed and Sealed this
Twenty-seventh Day of May, 2014

Michelle K. Lee
*Deputy Director of the United States Patent and Trademark Office*